United States Patent
Chang

(10) Patent No.: US 7,827,558 B2
(45) Date of Patent: Nov. 2, 2010

(54) MECHANISM FOR ENABLING A PROGRAM TO BE EXECUTED WHILE THE EXECUTION OF AN OPERATING SYSTEM IS SUSPENDED

(75) Inventor: Rong-Wen Chang, Fremont, CA (US)

(73) Assignee: Devicevm, Inc., San Jose, CA (US)

( * ) Notice: Subject to any disclaimer, the term of this patent is extended or adjusted under 35 U.S.C. 154(b) by 1498 days.

(21) Appl. No.: 10/882,559

(22) Filed: Jun. 30, 2004

(65) Prior Publication Data

US 2010/0138641 A1    Jun. 3, 2010

(51) Int. Cl.
*G06F 9/46* (2006.01)
*G06F 9/00* (2006.01)

(52) U.S. Cl. .......................... 718/104; 718/108; 713/1; 713/2

(58) Field of Classification Search .................. 718/108, 718/1; 713/1–2
See application file for complete search history.

(56) References Cited

U.S. PATENT DOCUMENTS

| | | | | |
|---|---|---|---|---|
| 4,747,040 A | * | 5/1988 | Blanset et al. | 718/108 |
| 4,835,677 A | * | 5/1989 | Sato et al. | 718/1 |
| 4,907,150 A | * | 3/1990 | Arroyo et al. | 713/323 |
| 4,993,017 A | * | 2/1991 | Bachinger et al. | 370/360 |
| 5,134,580 A | * | 7/1992 | Bertram et al. | 713/1 |
| 5,230,052 A | | 7/1993 | Dayan et al. | |
| 5,245,615 A | | 9/1993 | Treu | |
| 5,390,324 A | | 2/1995 | Burckhartt et al. | |

(Continued)

FOREIGN PATENT DOCUMENTS

CN    1710537    7/2005

(Continued)

OTHER PUBLICATIONS

Microsoft, Windows Media Player 6.4 for Windows 95, Windows 98, and Windows NT 4.0, 2009. (http://www.microsoft.com/downloads/details.aspx?FamilyID=b7a3f087-b81d-4dbe-a792-e587676a1533&displaylang=en).*

(Continued)

*Primary Examiner*—Lewis A Bullock, Jr.
*Assistant Examiner*—Jennifer N To
(74) *Attorney, Agent, or Firm*—Michael A. Glenn; Glenn Patent Group

(57) ABSTRACT

A mechanism is provided for enabling an auxiliary program to be executed in a computer system, after an operating system has been loaded and executed, without rebooting the computer system. This may be achieved by suspending execution of the operating system, executing the auxiliary program while execution of the operating system is suspended, and then resuming execution of the operating system. In suspending execution of the operating system, state information defining a current state of the computer system is saved. In resuming execution of the operating system, the saved state information is used to restore the computer system to the current state. No state information or data should be lost as a result of suspending and resuming execution of the operating system. From the viewpoint of the operating system and the applications (if any) executing within the environment provided by the operating system, execution of the auxiliary program is transparent.

36 Claims, 4 Drawing Sheets

U.S. PATENT DOCUMENTS

| | | | |
|---|---|---|---|
| 5,444,850 A * | 8/1995 | Chang | 709/222 |
| 5,455,933 A | 10/1995 | Schieve et al. | |
| 5,572,643 A | 11/1996 | Judson | |
| 5,590,197 A | 12/1996 | Chen et al. | |
| 5,596,711 A | 1/1997 | Burckhartt et al. | |
| 5,732,268 A * | 3/1998 | Bizzarri | 713/2 |
| 5,734,831 A | 3/1998 | Sanders | |
| 5,870,610 A | 2/1999 | Beyda | |
| 5,884,073 A * | 3/1999 | Dent | 713/2 |
| 6,058,430 A | 5/2000 | Kaplan | |
| 6,115,787 A | 9/2000 | Obara | |
| 6,173,438 B1 | 1/2001 | Kodosky et al. | |
| 6,175,917 B1 * | 1/2001 | Arrow et al. | 713/1 |
| 6,178,503 B1 * | 1/2001 | Madden et al. | 713/2 |
| 6,185,609 B1 | 2/2001 | Rangarajan et al. | |
| 6,308,319 B1 * | 10/2001 | Bush et al. | 717/141 |
| 6,327,598 B1 | 12/2001 | Kelley et al. | |
| 6,327,653 B1 * | 12/2001 | Lee | 713/100 |
| 6,330,584 B1 | 12/2001 | Joffe et al. | |
| 6,351,810 B2 * | 2/2002 | Gupta | 713/2 |
| 6,356,284 B1 | 3/2002 | Manduley et al. | |
| 6,367,074 B1 | 4/2002 | Bates et al. | |
| 6,389,462 B1 | 5/2002 | Cohen et al. | |
| 6,393,585 B1 * | 5/2002 | Houha et al. | 714/23 |
| 6,393,605 B1 | 5/2002 | Loomans | |
| 6,412,075 B1 * | 6/2002 | Klein | 713/322 |
| 6,463,531 B1 | 10/2002 | Aguilar et al. | |
| 6,549,773 B1 | 4/2003 | Linden et al. | |
| 6,615,303 B1 * | 9/2003 | Endo et al. | 710/260 |
| 6,631,469 B1 * | 10/2003 | Silvester | 713/2 |
| 6,715,016 B1 * | 3/2004 | Ohno et al. | 710/260 |
| 6,765,788 B2 | 7/2004 | Wu | |
| 6,948,058 B2 * | 9/2005 | Tung | 713/2 |
| 6,952,725 B1 * | 10/2005 | Raghunandan | 709/220 |
| 6,971,002 B2 * | 11/2005 | Austen et al. | 713/1 |
| 6,996,706 B1 * | 2/2006 | Madden et al. | 713/2 |
| 7,010,627 B2 | 3/2006 | Lin | |
| 7,076,644 B2 * | 7/2006 | Hsu | 713/1 |
| 7,076,646 B2 | 7/2006 | Chang | |
| 7,082,526 B2 * | 7/2006 | Chang | 713/2 |
| 7,098,899 B1 * | 8/2006 | Ginosar | 345/204 |
| 7,149,888 B1 * | 12/2006 | Hart et al. | 713/2 |
| 7,231,434 B2 * | 6/2007 | Raghunandan | 709/220 |
| 7,231,514 B2 * | 6/2007 | Geeng | 713/2 |
| 7,260,318 B2 * | 8/2007 | Wang et al. | 386/126 |
| 7,343,484 B2 * | 3/2008 | Du et al. | 713/2 |
| 7,356,677 B1 * | 4/2008 | Rafizadeh | 713/1 |
| 7,359,998 B2 * | 4/2008 | Chan et al. | 710/62 |
| 7,363,524 B2 * | 4/2008 | Watari et al. | 713/323 |
| 7,395,421 B1 * | 7/2008 | Nowlin | 713/2 |
| 7,409,536 B2 * | 8/2008 | Guo et al. | 713/1 |
| 7,424,601 B2 * | 9/2008 | Xu | 713/1 |
| 7,434,224 B2 * | 10/2008 | Lescouet et al. | 718/108 |
| 7,437,546 B2 * | 10/2008 | Shamia et al. | 713/1 |
| 7,469,336 B2 * | 12/2008 | Choo | 713/2 |
| 2001/0016879 A1 * | 8/2001 | Sekiguchi et al. | 709/319 |
| 2001/0018717 A1 * | 8/2001 | Shimotono | 709/319 |
| 2002/0010844 A1 * | 1/2002 | Noel et al. | 711/153 |
| 2002/0013802 A1 * | 1/2002 | Mori et al. | 709/1 |
| 2002/0078339 A1 * | 6/2002 | Hung-Ju et al. | 713/2 |
| 2002/0157001 A1 * | 10/2002 | Huang et al. | 713/2 |
| 2002/0162444 A1 * | 11/2002 | Yu et al. | 84/601 |
| 2002/0194241 A1 * | 12/2002 | Griffin et al. | 709/1 |
| 2003/0115443 A1 * | 6/2003 | Cepulis et al. | 713/2 |
| 2003/0188144 A1 | 10/2003 | Du et al. | |
| 2004/0006690 A1 * | 1/2004 | Du et al. | 713/2 |
| 2004/0015960 A1 * | 1/2004 | Wanchoo et al. | 717/178 |
| 2004/0093489 A1 * | 5/2004 | Hsu | 713/2 |
| 2004/0093490 A1 * | 5/2004 | Lo | 713/2 |
| 2004/0139442 A1 * | 7/2004 | Miyamoto | 718/108 |
| 2005/0080753 A1 * | 4/2005 | Vega et al. | 706/21 |
| 2005/0210476 A1 | 9/2005 | Wu | |
| 2005/0216722 A1 * | 9/2005 | Kim et al. | 713/2 |
| 2005/0223307 A1 | 10/2005 | Wu | |
| 2005/0246561 A1 | 11/2005 | Wu | |
| 2006/0010314 A1 * | 1/2006 | Xu | 713/2 |
| 2006/0031667 A1 * | 2/2006 | Raghunandan | 713/2 |
| 2006/0294357 A1 * | 12/2006 | Choo | 713/2 |
| 2007/0162736 A1 | 7/2007 | Wu | |
| 2008/0082816 A1 * | 4/2008 | Lam | 713/2 |
| 2008/0162914 A1 * | 7/2008 | Adrangi et al. | 713/2 |
| 2008/0313454 A1 * | 12/2008 | Choo | 713/2 |

FOREIGN PATENT DOCUMENTS

| | | |
|---|---|---|
| CN | 1710540 | 7/2005 |
| CN | 1716162 | 7/2005 |
| DE | 19530095 | 8/1995 |
| EP | 0760568 | 3/1997 |
| EP | 0 847 008 A2 | 10/1998 |
| GB | 2 318 658 A | 4/1998 |
| TW | 344814 | 11/1998 |
| TW | 472210 | 1/2002 |
| TW | 502162 | 9/2002 |
| WO | WO 97/202 81 A1 | 6/1997 |
| WO | WO 97/28499 A1 | 8/1997 |
| WO | WO 00/557 69 A2 | 9/2000 |
| WO | WO 01/01259 A1 | 1/2001 |

OTHER PUBLICATIONS

MediaForte, TV VISION P951T, 2000. (http://www.mediaforte.info/products/tv_and_radio/p951_t/drivers.htm).*
Intel Microsoft Toshiba, Advanced Configuration and Power Interface Specification, Feb. 2, 1999, Rev 1.0b pp. 219, 224-231.*
"NicheView Embedded Systems Web Browser Debuts", Jun. 30, 1999, Newsbytes, pp. 1-2.
"Will A $500 PC Work? Of course!", Jan. 15, 1996, Computer Reseller News, p. 14.
Powerquest, "BootMagic User Guide: Chapter 3, Using the BootMargic Menu," PowerQuest Corporation, 1998, 4 pages.
Agranat Systems Inc.; *Agranat Systems and Accelerated Technology Partner to Deliver Industry Leading Embedded Web Server Development Environment*; Jul. 20, 1998; PR Newswire; pp. 1-2.
C-Phone; *C-Phone Corporation Introduces TV Set-Top Device for Internet Access*; May 13, 1998; pp. 1-2.
Raddalgoda, Mal; *Desktop Computing in a Non-PC Age*; Electronic Engineering News; Mar. 22, 1999; pp. 1-2.

* cited by examiner

MECHANISM FOR ENABLING A PROGRAM TO BE EXECUTED WHILE THE EXECUTION OF AN OPERATING SYSTEM IS SUSPENDED

BACKGROUND

In a typical personal computer, there exists a processor, a basic input-output system (BIOS), a main memory, and a hard drive that stores an operating system and one or more application programs. The BIOS usually takes the form of executable instructions stored on a read-only memory (ROM). During a regular boot-up process, the processor accesses and executes the instructions in the BIOS, and under direction of the BIOS, the processor implements the booting process. The BIOS causes the processor to perform some low-level setup functions to prepare the computer for regular operation. After the setup functions are performed, the BIOS causes the processor to load and execute the operating system stored on the hard drive. By doing so, the BIOS in effect transfers control from itself to the operating system. After the operating system is loaded and executed by the processor, the boot-up process is complete and the computer is ready for operation.

The ROM (read-only-memory) on which the BIOS resides (referred to hereinafter as the BIOS ROM) is typically quite small in size. Despite this small size, however, it has been observed that one or more auxiliary programs may be stored on the BIOS ROM. These auxiliary programs may be executed during the booting process prior to and even in lieu of the operating system on the hard drive to provide certain desired functionalities. An example of an auxiliary program is the self-contained browser disclosed in U.S. patent application Ser. No. 09/449,065 entitled "Self Contained Browser Architecture" filed on Nov. 24, 1999, which is now abandoned, the contents of which are incorporated herein by this reference. Auxiliary programs are generally self-contained, meaning that they comprise all of the components that they need to operate. As a result, they do not need the operating system on the hard drive to function. This can be quite advantageous because even if the hard drive fails or the operating system becomes corrupted, the auxiliary programs are not affected. They can still function. Hence, the auxiliary programs are impervious to many system failures.

Currently, auxiliary programs are executed, if at all, during the boot-up process prior to the transfer of control to the operating system. A mechanism for invoking an auxiliary program during a boot-up process is disclosed in U.S. Pat. No. 7,082,526 entitled "Mechanism for Intuitively Invoking One or More Auxiliary Programs During A Computer Booting Process" filed on Mar. 14, 2003, the contents of which are incorporated herein by this reference. Once the operating system assumes control, however, the auxiliary programs typically can no longer be accessed. This means that if a user wishes to execute an auxiliary program after the operating system has already loaded and executed, the user has to reboot the computer. This can be an inconvenient and time-consuming process.

SUMMARY

In accordance with one embodiment of the present invention, there is provided a mechanism for enabling an auxiliary program to be executed in a computer system, after an operating system has been loaded and executed, without rebooting the computer system. In one embodiment, this is achieved by suspending execution of the operating system, executing the auxiliary program while execution of the operating system is suspended, and then resuming execution of the operating system. In suspending execution of the operating system, state information defining a current state of the computer system is saved. In resuming execution of the operating system, the saved state information is used to restore the computer system to the current state prior to suspension of execution. Because this is done, no state information or data should be lost as a result of suspending and resuming execution of the operating system. Thus, from the point of view of the operating system and the applications (if any) executing within the environment provided by the operating system, execution of the auxiliary program is relatively transparent.

In one embodiment, the state information defining the current state of the computer system is saved in a memory of the computer system. To ensure that this and other information are not overwritten or corrupted by the auxiliary program during execution, the auxiliary program, in one embodiment, is loaded and executed in a portion of the memory that is not accessible to the operating system (as a result, it is assured that the operating system could not have stored any information in that memory portion). During execution, the auxiliary program may need to use some other portion of the memory to store data generated during execution. In one embodiment, this portion of memory is allocated by the operating system before execution of the operating system is suspended. Because this memory portion is allocated by the operating system itself, it is assured that the memory portion has not been used by the operating system, and hence, is free and available. Thus, the auxiliary program can write data to the allocated memory portion without any concern of overwriting or corrupting any preexisting information.

In this manner, an auxiliary program is executed, after an operating system has been loaded and executed, without rebooting the computer system, in accordance with one embodiment of the present invention.

DETAILED DESCRIPTION OF EMBODIMENT(S)

Conceptual Overview

Figure 1:
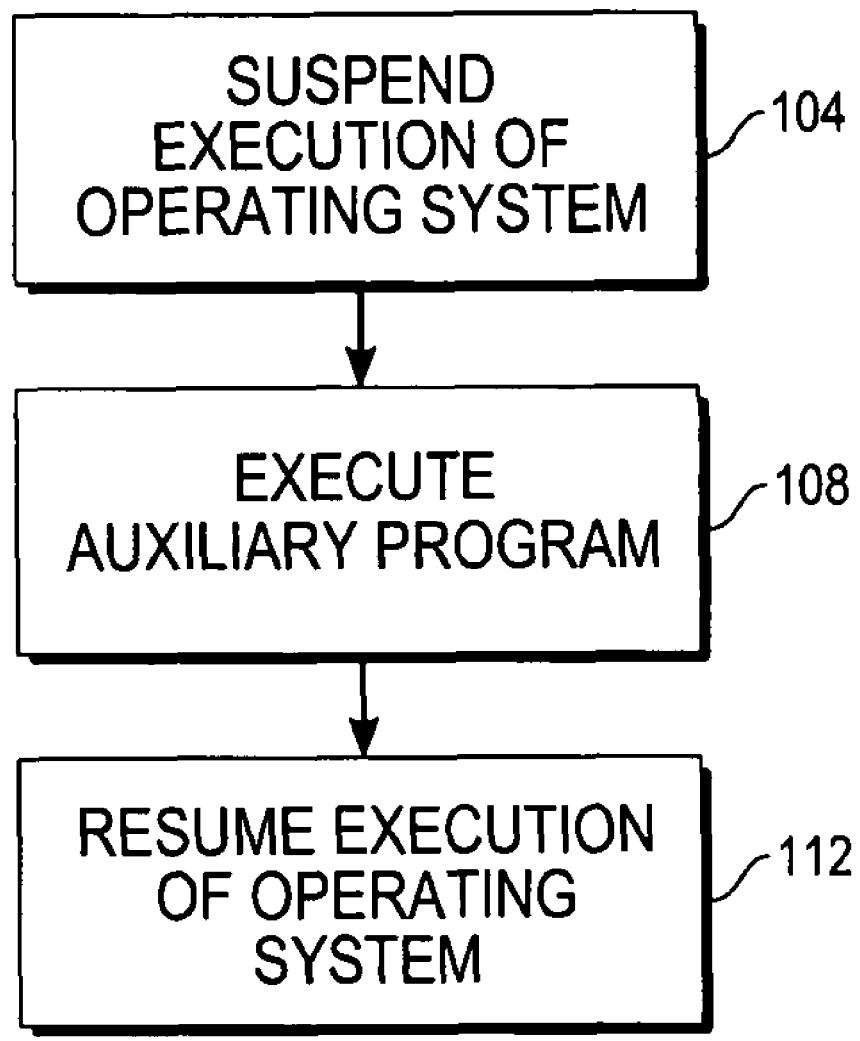
FIG. 1 shows a high-level operational flow diagram of a method implemented in accordance with one embodiment of the present invention.

FIG. 1 shows a high-level operational flow diagram of a method implemented in accordance with one embodiment of the present invention. The method of FIG. 1 is implemented in a computer system after an operating system has already been loaded and executed. The method enables an auxiliary program to be executed without rebooting the computer system.

As shown in FIG. 1, the method begins by suspending (block 104) execution of the operating system. By suspending execution, it is meant that the processor of the computer system stops executing any instructions associated with the operating system. After execution of the operating system is suspended, the auxiliary program is executed (block 108). During this execution, a user may interact with the auxiliary program in any way using any input/output mechanism (keyboard, mouse, monitor, etc.). At some point, execution of the auxiliary program is halted (e.g. by the user closing the program). When that occurs, execution of the operating system is resumed (block 112). During the entire process shown in FIG. 1, the computer system is not rebooted.

The method of FIG. 1 is relatively straightforward in concept. However, to implement it properly, a number of factors need to be taken into account. One such factor is that of state maintenance. To elaborate, prior to suspending execution of the operating system, the computer system has a certain state. This state is defined by the states of all of the components in the computer system, including for example, the state of the operating system, the state of the applications running within the environment provided by the operating system, the state of the hardware components of the computer system, etc. This state of the computer system should not be lost when execution of the operating system is suspended (otherwise, suspending execution of the operating system would be no different than rebooting). Rather, state should be preserved so that when execution of the operating system is resumed, the computer system is put back into the same state as when execution of the operating system was suspended. This maintenance of state ensures that no information will be lost as a result of suspending execution of the operating system, and enables execution of the auxiliary program to be carried out relatively transparently. In one embodiment, to preserve the computer system's state, a set of state information defining a current state of the computer system is saved prior to suspending execution of the operating system. Then, when execution of the operating system is resumed, the state information is used to restore the computer system to the current state (i.e. the state the computer system had prior to suspending execution of the operating system).

Another factor to take into account in implementing the above method is that of memory preservation. When the operating system executes, and when the applications running inside the environment provided by the operating system execute, their code is stored in memory, and they write information to memory. Also, in one embodiment, the state information discussed above is saved to memory before suspending execution of the operating system. All of this information should stay intact. Put another way, all of the memory portions used to store this information should be preserved (i.e. should not be overwritten); otherwise, state information and other data will be lost as a result of suspending and resuming execution of the operating system. Memory preservation is made difficult by the fact that typically, the auxiliary program is executed using the same memory as that used by the operating system and applications. Unless the auxiliary program somehow avoids use of the already-occupied memory portions, information will be lost. That being the case, execution of the auxiliary program has to be managed carefully.

In one embodiment, to ensure memory preservation, at least two measures are taken. First, the code of the auxiliary program is loaded into and executed in a portion of the memory that is not accessible by the operating system. This memory portion may, for example, be reserved at boot-up time. Because the operating system cannot access this memory portion, it is assured that the memory portion will not contain any operating system or application information.

During execution, the auxiliary program may need to use some other portion of the memory to store data generated during execution. In one embodiment, as a second measure to ensure memory preservation, this portion of memory is allocated by the operating system before execution of the operating system is suspended, and is passed to the auxiliary program. Because this memory portion is allocated by the operating system itself, it is assured that the memory portion has not been used by the operating system, and hence, is free and available. Thus, the auxiliary program can write data to the memory portion without any concern of overwriting or corrupting any preexisting information. By managing the use of memory in this manner, this embodiment of the present invention enables the auxiliary program to be executed safely (i.e. in a memory-preserving way) while the execution of the operating system is suspended.

Computer System Overview

Figure 2:
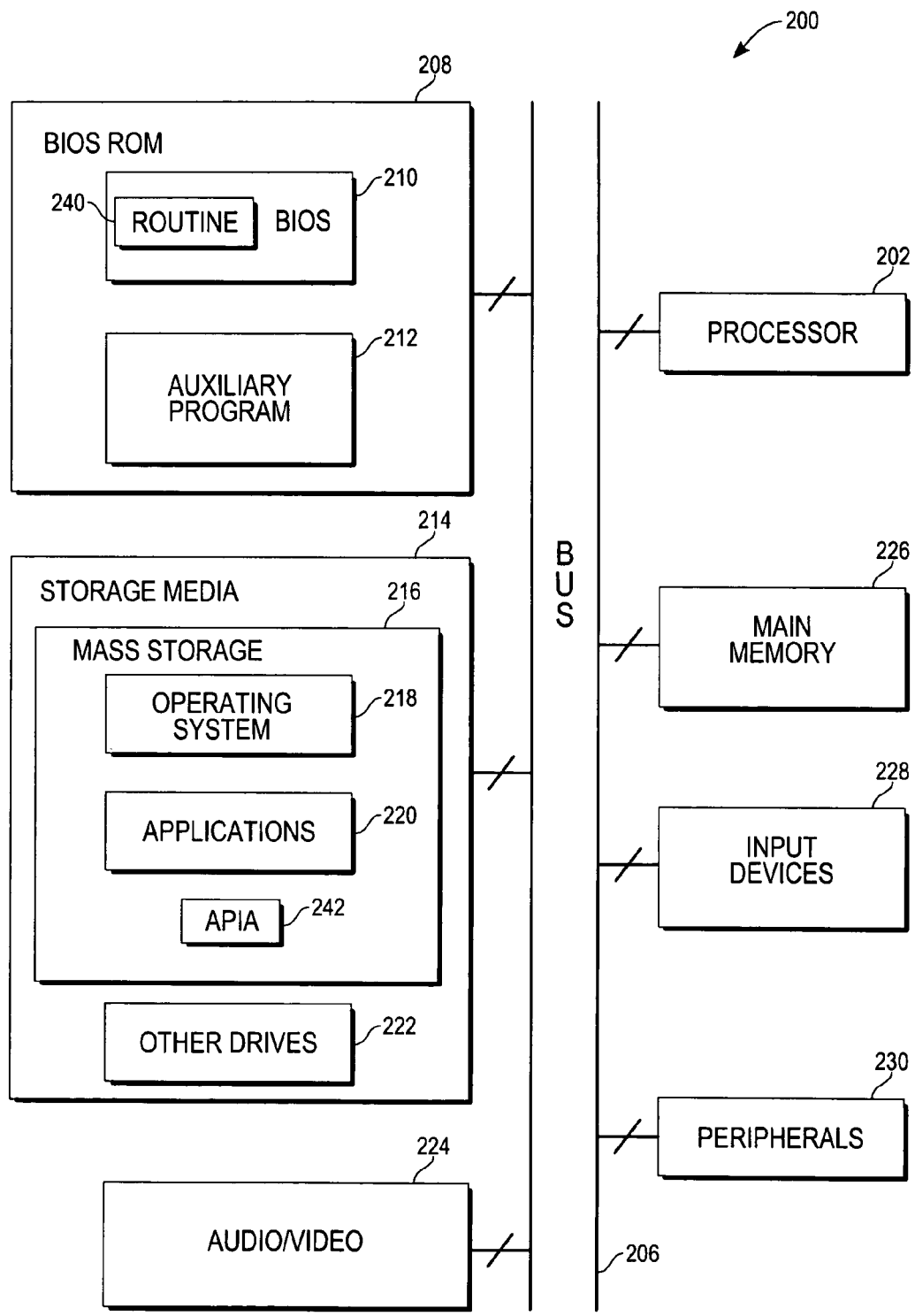
FIG. 2 is a block diagram of a computer system in which one embodiment of the present invention may be implemented.

With reference to FIG. 2, there is shown a block diagram of a computer system 200 in which one embodiment of the present invention may be implemented. As shown, computer system 200 comprises a processor 202, BIOS ROM 208, main memory 226, storage media 214, input devices 228, audio/video components 224, and peripherals 230, all coupled together by a system bus 206. The BIOS ROM 208 comprises a BIOS 210 and one or more auxiliary programs 212. The storage media 214 comprises a mass storage 216 and zero or more other drives 222. The mass storage 216 comprises an operating system 218, one or more regular applications 220, and a special auxiliary program invocation application (hereinafter APIA) 242. For the sake of simplicity, only these components are shown. If so desired, computer system 200 may comprise additional components.

Processor

Processor 202 is the component responsible for executing instructions to provide the overall functionality of the computer system 200. For purposes of the present invention, processor 202 may be any type of processor made by any manufacturer capable of executing any type of computer instructions. For the sake of simplicity, only one processor 202 is shown in FIG. 2; however, it should be noted that computer system 200 may comprise additional processors, if so desired.

Main Memory

Main memory 226 provides the memory needed by processor 202 to execute programs. More specifically, processor 202 uses main memory 226 to store program instructions while those instructions are being executed. In addition, processor 202 uses main memory 226 to store data and other information generated during the execution of instructions. Furthermore, main memory 226 may be used to store the computer system state information discussed previously. The use and management of main memory 226 will be discussed in greater detail in a later section.

User Interface

The audio/video components 224 and input devices 228 enable a user to interact with the computer system 200. The audio/video components 224 may include, for example, a video card, a video display, an audio card, and a set of speakers. These components 224 enable the computer system 200 to provide information to a user. The input devices 228 enable the user to provide information to the computer system 200. The input devices 228 may include, for example, a keyboard, an infrared receiver for receiving infrared signals (such as signals from a remote control), and a cursor control device such as a mouse, a trackball, a remote-controlled pointing device, etc. Basically, anything that enables the computer system 200 to interface with a user can be included as components 224 and 228.

BIOS ROM

The BIOS ROM 208 stores the basic input-output system (BIOS) 210 of the computer system 200 (note: BIOS ROM 208 is shown as a read-only-memory (ROM) for illustrative purposes only; for purposes of the present invention, BIOS ROM 208 may take the form of any computer-readable medium). In one embodiment, BIOS ROM 208 further comprises one or more auxiliary programs 212 (for the sake of simplicity, only one auxiliary program 212 is shown).

In one embodiment, BIOS 210 takes the form of a set of computer instructions executable by processor 202. BIOS 210 comprises instructions for causing processor 202 to implement a regular boot-up process. During such a process, BIOS 210 causes processor 202 to implement a variety of standard functions (e.g. initializing all of the hardware components of the computer system 200, loading an operating system 218 and transferring control to the operating system 218, etc.). Such standard functions are well known and will not be described in detail herein.

In one embodiment, in addition to the standard functions, BIOS 210 further causes processor 202 to perform some other functions that are typically not performed during a boot-up process. In one embodiment, these functions include reserving a portion of main memory 226, and setting an instruction trap.

To elaborate, when BIOS 210 causes processor 202 to transfer control over to an operating system 218, BIOS 210 provides extended system configuration data (ESCD) to the operating system 218. This ESCD specifies to the operating system 218 what components of the computer system 200 are available to the operation system 218 for use. One of the items specified in the ESCD is the main memory 226, and more specifically, the ESCD specifies which portions of the main memory 226 are available to the operating system 218. In one embodiment, the ESCD provided by BIOS 210 to the operating system 218 indicates that a certain portion of main memory 226 is not available to the operating system 218.

Figure 3:
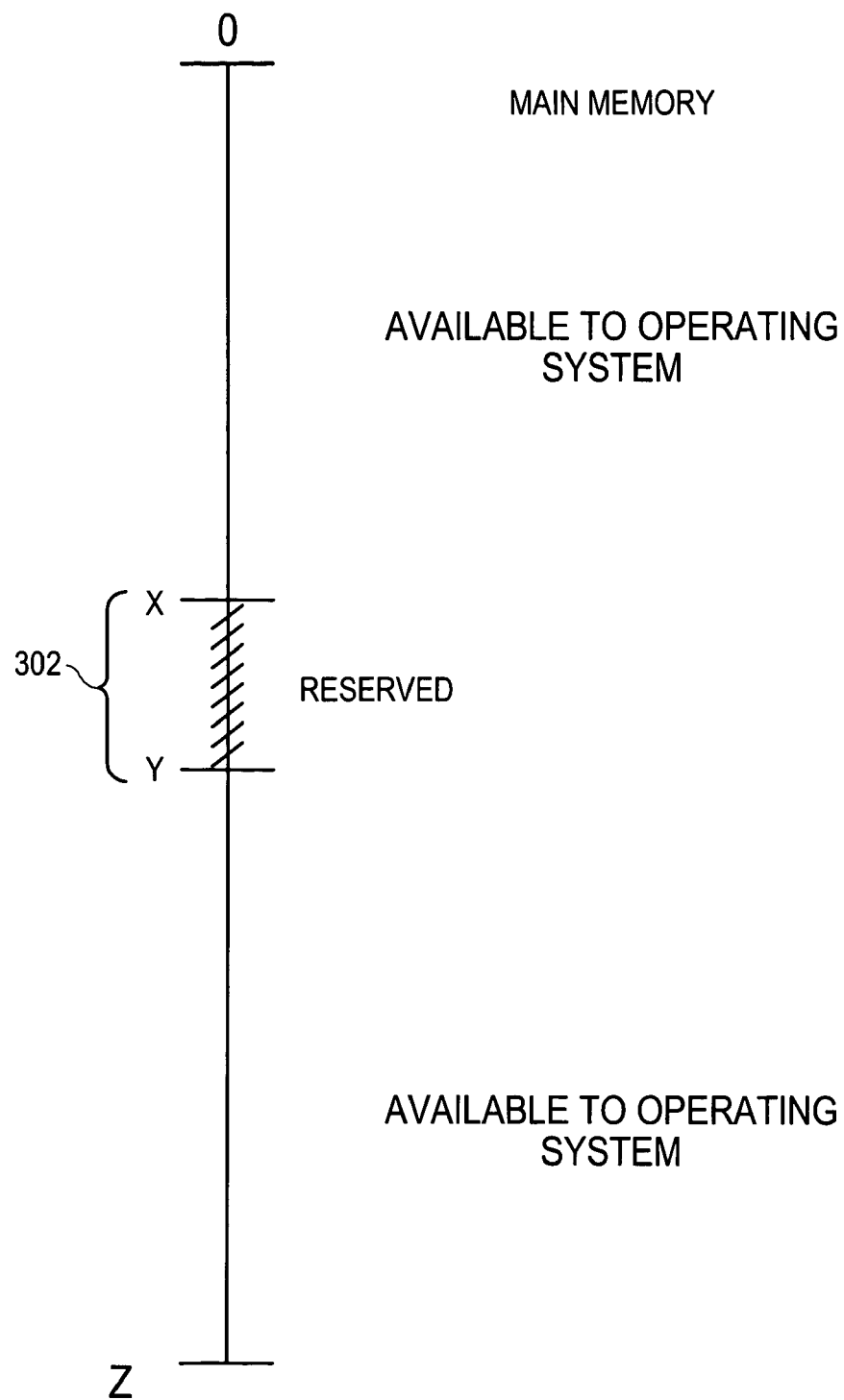
FIG. 3 is a diagrammatic representation of a main memory in which a memory portion has been reserved.

For example, if the memory address range of the main memory 226 is from address 0 to address z, the ESCD may specify that the portions of main memory from address 0 to address x, and from address y to address z are available for use by the operating system 218. This implies that the portion of main memory 226 between address x and address y is not available to the operating system 218 (this is shown diagrammatically in FIG. 3). By providing appropriate information in the ESCD in this manner, BIOS 210 can indicate to the operating system that a certain portion 302 of main memory 226 is not to be used, and hence, can cause that portion 302 to be reserved. In one embodiment, it is this reserved memory portion 302 that is used by processor 202 to execute auxiliary program 212, as will be described in greater detail in a later section.

In addition to reserving a memory portion 302, BIOS 210 also causes processor 202 to set a trap for a particular power down instruction. With this trap in place, when processor 202 encounters the power down instruction, processor 202 does not execute the instruction. Rather, a system management interrupt is triggered, which causes processor 202 to execute a trap handling routine. In one embodiment, the trap handling routine 240 is part of BIOS 210, and when invoked, causes processor 202 to: (1) perform some low level functions; and (2) execute the auxiliary program 212. As will be discussed in greater detail in a later section, this trap/routine mechanism is used in one embodiment to execute the auxiliary program 212 after execution of an operating system 218 has been suspended.

As noted previously, BIOS ROM 208 further comprises one or more auxiliary programs 212. As used herein, the term auxiliary program refers broadly to any program that can be executed outside of an operating environment provided by the general-purpose operating system 218 of the computer system 200. An auxiliary program 212 may provide any type of desired functionality. Examples of auxiliary program functionalities include but are not limited to browser functionality, media player functionality (e.g. CD player, DVD player, MP3 player, etc.), and tuner (e.g. TV, radio, etc.) functionality. In one embodiment, an auxiliary program 212 is a self-contained program, which means that it comprises all of the components that it needs to operate. For example, an auxiliary program 212 may comprise its own operating system kernel and device drivers. As a result, an auxiliary program 212 does not need the general-purpose operating system 218 of the computer system 200 in order to function.

For illustrative purposes, auxiliary program 212 is shown in FIG. 2 as residing on the BIOS ROM 208. However, it should be noted that this is not required. If so desired, auxiliary program 212 may reside on a separate storage medium (not shown).

Storage Media

The storage media 214 provide the non-volatile storage for the computer system 200. In one embodiment, storage media 214 comprise a mass storage magnetic hard drive 216, and zero or more other drives 222. The other drives 222 may include, for example, a floppy drive, a CD-ROM drive, a DVD drive, a CD-RW drive, etc. Drives 222 enable the computer system 200 to read from and write to storage media other than hard drive 216. In one embodiment, all of the storage media 214 are accessed via a common controller interface, such as an IDE interface (not shown). In the embodiment shown, storage media 214 are shown as drives. However, it should be noted that storage media 214 need not be drives but rather may take on other forms, for example, disk-on-chip modules, flash memory, etc. All possible forms are within the scope of the present invention.

As shown, mass storage 216 comprises a plurality of programs, including an operating system 218, one or more applications 220, and an APIA 242. The operating system 218 is the general-purpose operating system that is loaded and executed during a regular boot-up process to provide an overall operating environment for the computer system 200. The applications 220 and the APIA 242 run within the environment provided by the operating system 218. For purposes of the present invention, operating system 218 may be any operating system, including but not limited to Windows XP.

In one embodiment, operating system 218 has a suspense capability. That is, the operating system 218 is capable of putting itself and the computer system 200 into a suspense mode in which all instruction execution is suspended. This capability is typically invoked to conserve power.

When operating system 218 puts the computer system 200 into suspense mode, it first gathers all of the state information that defines a current state of the computer system 200. This state information many include, for example, information pertaining to the state of the operating system 218, information pertaining to the state of any applications 220, 242 running within the environment provided by the operating system 218, information pertaining to the state of the hardware components of the computer system 200, etc. After this state information is gathered, the operating system 218 stores the information into main memory 226 (or into hard drive 216, if so desired, but storing the state information in main memory 226 make the process of resuming execution of the operating system 218 much faster). Once that is done, the operating system 218 is ready to suspend execution. As a final step, the operating system 218 provides a power down instruction to the processor 202 (as will be discussed further below, it is this power down instruction that is trapped). When (and if) executed, this power down instruction causes the processor 202 to write a set of information to a system management port (not shown) of the computer system 200. When this information is written to the system management port, almost all of the components (except main memory 226) of the computer system 200 are powered down. In this manner, the operating system 218 puts the computer system 200 into a power saving suspense mode in which no instructions are executed by the processor 202.

The computer system 200 then waits for some hardware-driven event (e.g. a user pressing a key on the keyboard, clicking a mouse button, etc.) that indicates that regular operation should resume. In response to such an event, hardware in the computer system 200 causes processor 202 to resume execution of the operating system 218. Upon resuming execution, the operating system 218 uses the state information stored in the main memory 226 to restore the computer system 200 to the state that it had prior to suspending execution. By doing so, the operating system 218 makes it appear as if execution had never been suspended.

In one embodiment, this suspense capability of the operating system 218 is exploited (in part) to enable the auxiliary program 212 to be executed, after the operating system 218 has been loaded and executed, without rebooting the computer system 200. The manner in which this capability is exploited will be explained in greater detail in a later section.

As noted previously, mass storage 216 further comprises APIA 242. APIA 242 is an application that can be invoked and executed within the operating environment provided by the operating system 218. Put another way, after the operating system 218 has been loaded and executed, APIA 242 appears in the operating system interface as a regular executable program. In one embodiment, APIA 242 is the application that is invoked by a user to cause the auxiliary program 212 to be executed. When executed, APIA 242 causes execution of the operating system 218 to be suspended, which in turn, causes the auxiliary program 212 to be executed (as will be explained in greater detail in a later section). In one embodiment, APIA 242 performs several functions.

One function performed by APIA 242 is to obtain an allocation of memory from the operating system 218. Recall from previous discussion that the auxiliary program 212 may need to use a portion of main memory 226 to store data generated during execution of the auxiliary program 212. The auxiliary program 212 cannot directly ask the operating system 218 to allocate this portion of main memory 226 to it because by the time the auxiliary program 212 executes, execution of the operating system 218 will have already been suspended. To circumvent this problem, APIA 242 obtains the memory allocation from the operating system 218 on behalf of the auxiliary program 212, and then passes the information pertaining to the memory allocation to the auxiliary program 212. This information may be passed to the auxiliary program 212 in a variety of ways, including for example, writing the information to one or more specific locations in the reserved portion 302 (FIG. 3) of main memory 226, writing the information to one or more specific hardware registers, etc. When the auxiliary program 212 executes, it looks in the specific location(s) or register(s) to obtain the memory allocation information. Once the auxiliary program 212 has the memory allocation information, it knows what portion of main memory 226 to use to store its execution-generated data.

Since this memory portion was allocated by the operating system 218 itself, it is assured that the memory portion has not been used by the operating system 218, and hence, is free and available. Thus, the auxiliary program 212 can write data to the memory portion without any concern of overwriting or corrupting any preexisting information. In this manner, APIA 242 facilitates the execution of auxiliary program 212 in a memory-preserving manner.

In addition to obtaining a memory allocation for the auxiliary program 212, APIA 242 also causes the operating system 218 to enter into suspense mode. In one embodiment, APIA 242 does this by issuing a suspend instruction to the operating system 218. In response to this instruction, the operating system 218 initiates the process of putting itself and the computer system 200 into suspense mode. As will be described in greater detail in a later section, this causes execution of the operating system 218 to be suspended, and causes the auxiliary program 212 to be executed.

Peripherals

In addition to the components already described, the computer system 200 may further comprise other peripherals 230, such as printers, scanners, network cards, etc. These peripherals 230 may interface with the computer system 200 via various ports and interfaces, such as parallel ports, serial ports, USB ports, SCSI interfaces, etc. Generally, any device that is capable of interfacing with the computer system 200 can be included as one of the peripherals 230.

Sample Operation

The components of computer system 200 have been disclosed. With reference to the various figures, a sample operation of the computer system 200, in accordance with one embodiment of the present invention, will now be described.

In one embodiment, operation begins when a user powers up or reboots the computer system 200. Upon power-up or reboot, the processor 202 (FIG. 2) accesses the BIOS 210, and begins executing the instructions in the BIOS 210. Under control of the BIOS 210, processor 202 performs some standard boot-up functions (e.g. initializing the various components to prepare them for regular operation). In addition, BIOS 210 causes the processor 202 to set a trap for a particular power down instruction. With this trap in place, when processor 202 subsequently encounters the particular power down instruction during regular operation, the processor 202 will not execute the instruction. Instead, a system management interrupt will be triggered, which will cause processor 202 to start executing the trap handling routine 240 of the BIOS 210.

After the trap is set, BIOS 210 causes processor 202 to either execute the auxiliary program 212 or to load and execute the operating system 218. For purposes of illustration, it will be assumed in the present discussion that processor 202 proceeds to load and execute the operating system 218. Before control is transferred from the BIOS 210 to the operating system 218, however, the BIOS 210 provides a set of ESCD to the operating system 218. Part of this ESCD specifies which portions of the main memory 226 are available to the operating system 218 for use. In one embodiment, the ESCD indicates that a certain portion (for example, portion 302 of FIG. 3) of the main memory 226 is not to be used by the operating system 218. By specifying this in the ESCD, the BIOS 210 causes the operating system 218 to reserve the memory portion 302 for other use. In one embodiment, the reserved memory portion 302 is large enough to hold the auxiliary program 212. After providing the ESCD, the BIOS 210 transfers control from itself to the operating system 218.

After control is transferred, the operating system 218 causes the processor 202 to perform all of the necessary tasks to prepare the computer system 200 for regular operation. By the time all of the preparatory tasks are performed (which include making the applications 220 and APIA 242 appear in the operating system interface as programs that can be invoked), the computer system 200 is ready for regular operation. During regular operation, any desired operation may be performed, including executing any of the applications 220 and/or APIA 242.

Figure 4:
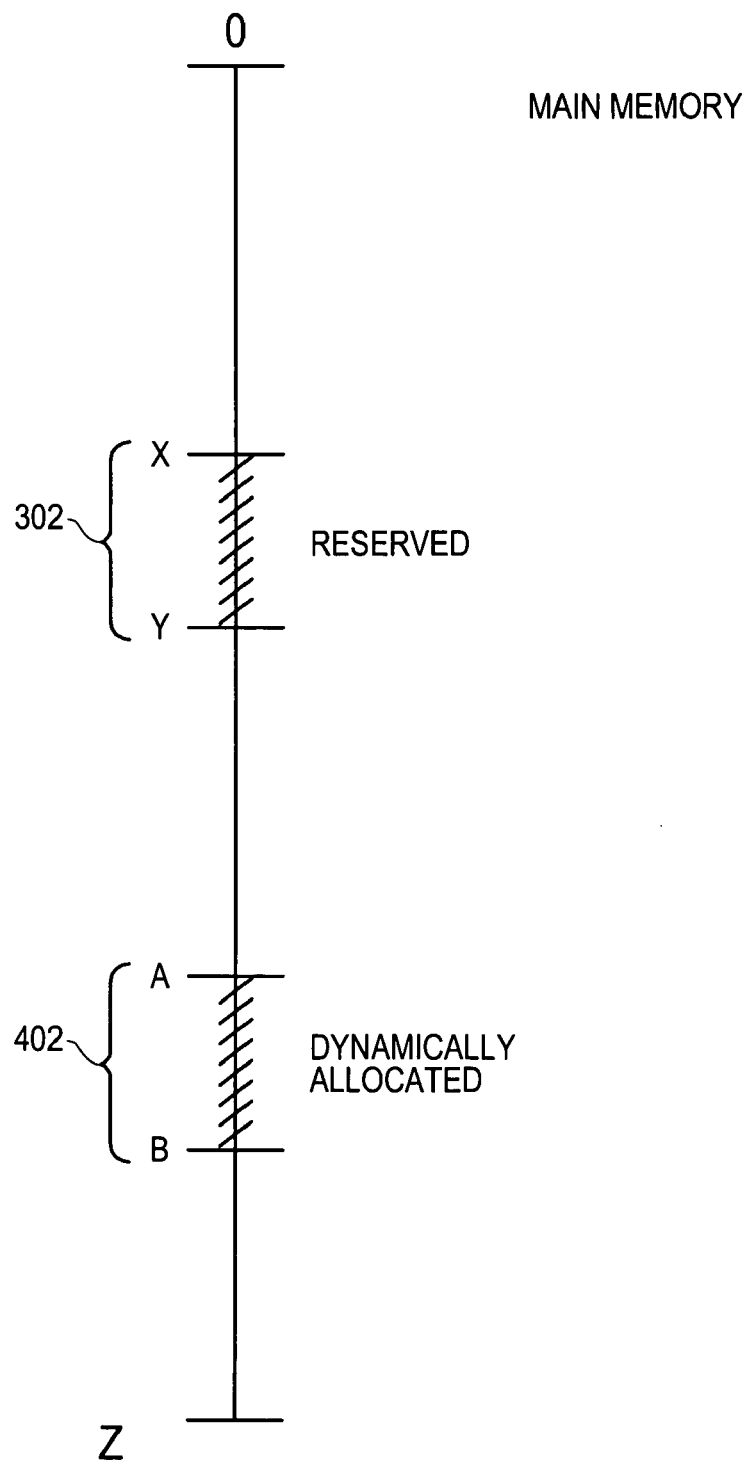
FIG. 4 is a diagrammatic representation of the main memory of FIG. 3 further showing a memory portion that has been dynamically allocated by an operating system.

At some point, a user may invoke APIA 242, thereby indicating that the user wishes to execute the auxiliary program 212. When the APIA 242 is invoked, it performs several functions. Initially, it sends a memory allocation request to the operating system 218 to request a portion of the main memory 226 that is currently free. This memory portion is intended for use by the auxiliary program 212 during execution of the auxiliary program 212 to store execution-generated data. The operating system 218 responds to this request by allocating a free memory portion (for example, memory portion 402 of FIG. 4) to the APIA 242. Upon receiving this memory allocation, the APIA 242 passes information pertaining to the memory allocation to the auxiliary program 212. In one embodiment, the APIA 242 does so by writing the information into one or more specific locations in the reserved memory portion 302 (FIG. 3), or by writing the information into one or more specific hardware registers.

After the memory allocation is obtained, and information pertaining to the memory allocation is passed to the auxiliary program 212, the APIA 242 sends a suspend instruction to the operating system 218 to cause the operating system 218 to suspend execution. In response to this instruction, the operating system 218 gathers all of the state information that defines a current state of the computer system 200. This state information many include, for example, information pertaining to the state of the operating system 218, information pertaining to the state of any applications 220, 242 running within the environment provided by the operating system 218, information pertaining to the state of the hardware components of the computer system 200, etc. After this state information is gathered, the operating system 218 stores the information into main memory 226. Once that is done, the operating system 218 is ready to suspend execution.

As a final step, the operating system 218 provides a power down instruction to the processor 202. This instruction is intended to cause almost all of the hardware components (except for the main memory 226) of the computer system 200 to be powered down. Recall, however, that a trap has been set for this power down instruction. Thus, rather than execute this instruction, the processor 202 jumps to the trap handling routine 240, and starts executing the instructions contained therein. As a result, the computer system 200 is not actually powered down. By invoking the suspense capability of the operating system 218 and then trapping the power down instruction in this way, it is possible to suspend execution of the operating system 218 without suspending the computer system 200. Because the computer system 200 is not suspended, operation can continue, even though execution of the operating system 218 has been suspended.

Under control of the trap handling routine 240, the processor 202 performs several functions. First, the processor 202 reinitializes at least some of the hardware components of the computer system 200 to prepare them for operation. At least one exception to this is the main memory 226, which is not reinitialized. Thereafter, the trap handling routine 240 causes the processor 202 to execute the auxiliary program 212. Initially, the trap handling routine 240 causes the processor 202 to load the auxiliary program 212 from the BIOS ROM 208 into the reserved portion 302 (FIG. 3) of main memory 226 (in one embodiment, the auxiliary program 212 is compiled to run within this portion 302 of the main memory 226). Then, the trap handling routine 240 causes the processor 202 to execute the auxiliary program 212 in the reserved memory portion 302. Control is thus transferred from the trap handling routine 240 to the auxiliary program 212.

When the auxiliary program 212 executes, it initially determines which memory portion it can safely use to store data generated during execution. The auxiliary program 212 makes this determination by accessing the information pertaining to the allocated memory portion 402 (FIG. 4) that was passed by the APIA 242. In one embodiment, the auxiliary program 212 does so by accessing one or more specific locations in the reserved memory portion 302, or one or more specific hardware registers (in one embodiment, the auxiliary program 212 is programmed with the knowledge of where to look for this information). After obtaining the memory allocation information, the auxiliary program 212 knows which portion of memory (portion 402 of FIG. 4) it is to use to store execution-generated data. Armed with this knowledge, the auxiliary program 212 proceeds with full-scale execution.

As noted previously, the auxiliary program 212, in one embodiment, is a self-contained program that comprises all of the components (including some operating system components and device drivers) that it needs to operate. Thus, during execution, the auxiliary program 212 can make use of any of the computer system components, and a user may interact with the auxiliary program 212 using any of the input/output devices 224, 228. As the auxiliary program 212 executes, it writes data (if any) generated during execution to the memory portion 402 that was previously allocated by the operating system 218. Because the auxiliary program 212 writes only to this memory portion 402, and because the auxiliary program 212 itself is loaded into and executed from the reserved portion 302 of main memory 226, it is assured that execution of the auxiliary program 212 will not disturb any of the existing contents of the main memory 226. Thus, the auxiliary program 212 is executed in a memory-preserving manner. The auxiliary program 212 may be executed for as long as a user desires.

At some point, the user may decide to terminate execution of the auxiliary program 212. When that happens, control is transferred back to the trap handling routine 240 of the BIOS 210. The trap handling routine 240 thereafter causes the processor 202 to resume execution of the operating system 218. Upon resuming execution, the operating system 218 accesses the main memory 226 and obtains therefrom the state information that was previously stored. Using this state information, the operating system 218 restores the computer system 200 to the state that it had prior to suspending execution of the operating system 218. After the computer system 200 is restored, the APIA 242 terminates execution. This in turn causes the operating system 218, at some point, to deallocate the memory portion 402 that was previously allocated to the APIA 242. The computer system 200 is thus put into the same state as if the auxiliary program 212 had never been executed.

In the manner described, an auxiliary program may be executed in a computer system, after an operating system has been loaded and executed, without rebooting the computer system.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims.

What is claimed is:

1. A method implemented in a computer system, the computer system having an operating system executing thereon, the method comprising:
    a processor accessing a basic input output system (BIOS) upon power-up or reboot;
    the BIOS, during the power-up or reboot, causing the processor to set a trap for a particular power-down instruction for the operating system;
    the BIOS, during the power-up or reboot, causing the operating system to reserve a portion of memory for other use;
    receiving a request to execute an auxiliary program, allocating a second portion of memory that is currently free for use by the auxiliary program for storing execution-generated data, and passing information pertaining to the second memory allocation to the auxiliary program;
    the operating system providing the particular power-down instruction to the processor in response to the request to execute the auxiliary program;
    the processor executing an associated trap handling routine of the BIOS in response to receiving the particular power-down instruction;
    suspending execution of the operating system; and
    executing the auxiliary program from the portion of memory that is allocated for other use while execution of the operating system is suspended, the auxiliary program comprising a self-contained program that contains all components for operating the auxiliary program.

2. The method of claim 1, wherein the auxiliary program further comprises its own operating system kernel and device drivers.

3. The method of claim 1, further comprising the step of:
    storing state information that defines a current state of the computer system prior to suspending execution of the operating system, the state information enabling the current state of the computer system to be restored at a later time.

4. The method of claim 3, further comprising the steps of:
    resuming execution of the operating system; and
    restoring the computer system, based upon the state information, to the current state;
    wherein the method is carried out without rebooting the computer system.

5. The method of claim 4, wherein no state information or data is lost as a result of suspending and resuming execution of the operating system.

6. The method of claim 1, further comprising the steps of:
    loading and executing the operating system; and
    transferring control from the BIOS to the operating system.

7. The method of claim 1, further comprising:
    providing an indication to the operating system, during a boot-up process, that the particular portion of the memory is not available for use by the operating system.

8. The method of claim 1, the method further comprising the steps of:
    sending a memory allocation request to the operating system;
    receiving a memory allocation from the operating system, the memory allocation indicating a particular portion of the memory that is free and available for use; and
    passing information pertaining to the memory allocation to the program to enable the program to use the particular portion of memory during execution.

9. The method of claim 8, wherein sending, receiving, and passing are performed prior to suspending execution of the operating system.

10. The method of claim 8, wherein passing comprises:
    storing the information pertaining to the memory allocation in a location that the auxiliary program knows to access.

11. The method of claim 10, wherein executing the program comprises:
    accessing the information pertaining to the memory allocation; and
    using the particular portion of memory indicated by the memory allocation to store data generated during execution of the auxiliary program.

12. The method of claim 1, wherein the auxiliary program does not need the operating system in order to operate and the auxiliary program comprises operating system components.

13. The method of claim 1, wherein the auxiliary program comprises a web browser.

14. The method of claim 1, wherein the auxiliary program comprises a media player.

15. The method of claim 1, wherein the auxiliary program comprises a tuner.

16. The method of claim 1, wherein suspending execution of the operating system comprises:
    instructing the operating system to enter a power-saving mode, which causes execution of the operating system to be suspended;
    detecting that an instruction is about to be executed, which will cause one or more hardware components of the computer system to power down; and
    trapping the instruction to power down the one or more hardware components, thereby, preventing the one or more hardware components from powering down.

17. The method of claim 16, wherein trapping comprises:
    invoking a routine that will cause the auxiliary program to be executed.

18. The method of claim 17, further comprising the step of:
    loading the auxiliary program from the BIOS read only memory (ROM) into the portion of the memory that is not accessed by the operating system.

19. A computer system, comprising:
    a processor for accessing a basic input output system (BIOS) upon power-up or reboot;
    a mechanism for the BIOS, during the power-up or reboot, to cause the processor to set a trap for a particular power-down instruction for an operating system;
    a mechanism for causing the BIOS, during the power-up or reboot, to cause the operating system to reserve a portion of memory for other use;
    a mechanism for receiving a request to execute an auxiliary program, for allocating a second portion of memory that is currently free for use by the auxiliary program for storing execution-generated data, and for passing information pertaining to the second memory allocation to the auxiliary program;
    a mechanism for the operating system to provide the particular power-down instruction to the processor in response to the request to execute the auxiliary program;
    a mechanism for executing an associated trap handling routine of the BIOS in response to the received particular power-down instruction;
    a mechanism for causing execution of an operating system to be suspended; and
    a mechanism for causing the auxiliary program to be executed from the portion of memory that is allocated for exclusive other use while execution of the operating system is suspended, the auxiliary program comprising a self-contained program that contains all components for operating the auxiliary program.

20. The computer system of claim 19, wherein the auxiliary program further comprises its own operating system kernel and device drivers.

21. The computer system of claim 19, further comprising an operating system, wherein the operating system comprises:
   a mechanism for receiving an instruction to enter a power-saving mode;
   a mechanism for storing state information that defines a current state of the computer, the state information enabling the current state of the computer system to be restored at a later time; and
   a mechanism for suspending execution of the operating system;
   wherein the computer system suspends execution of the operating system, executes the program, and resumes execution of the operating system without rebooting.

22. The computer system of claim 21, wherein the operating system further comprises:
   a mechanism for resuming execution of the operating system; and
   a mechanism for restoring the computer system, based upon the state information, to the current state when execution of the operating system resumes.

23. The computer system of claim 22, wherein no state information or data is lost as a result of suspending and resuming execution of the operating system.

24. The computer system of claim 19, further comprising a mechanism for loading and executing the operating system, and transferring control from the BIOS to the operating system.

25. The computer system of claim 24, wherein the auxiliary program has its own set of operating system components.

26. The computer system of claim 19, further comprising:
   a mechanism for providing an indication to the operating system, during a boot-up process, that the particular portion of the memory is not available for use by the operating system.

27. The computer system of claim 19, wherein the computer system further comprises:
   a mechanism for sending a memory allocation request to the operating system;
   a mechanism for receiving a memory allocation from the operating system, the memory allocation indicating a particular portion of the memory that is free and available for use; and
   a mechanism for passing information pertaining to the memory allocation to the program to enable the program to use the particular portion of memory during execution.

28. The computer system of claim 27, wherein the information pertaining to the memory allocation is passed to the program before execution of the operating system is suspended.

29. The computer system of claim 27, wherein the mechanism for passing the information pertaining to the memory allocation comprises:
   a mechanism for causing the information pertaining to the memory allocation to be stored in a location that the auxiliary program knows to access.

30. The computer system of claim 29, wherein the auxiliary program comprises:
   a mechanism for accessing the information pertaining to the memory allocation; and
   a mechanism for using the particular portion of memory indicated by the memory allocation to store data generated during execution of the auxiliary program.

31. The computer system of claim 19, further comprising the auxiliary program, wherein the program comprises a web browser.

32. The computer system of claim 19, further comprising the auxiliary program, wherein the program comprises a media player.

33. The computer system of claim 19, further comprising the auxiliary program, wherein the program comprises a tuner.

34. The computer system of claim 19, wherein the mechanism for causing execution of the operating system to be suspended comprises:
   a mechanism for instructing the operating system to enter a power-saving mode, which causes execution of the operating system to be suspended.

35. The computer system of claim 34, further comprising:
   a mechanism for detecting that an instruction is about to be executed, which will cause one or more hardware components of the computer system to power down; and
   a mechanism for trapping the instruction to cause it to not be executed, thereby, preventing the one or more hardware components from powering down.

36. The computer system of claim 35, further comprising:
   a mechanism for setting a trap for the instruction to cause the instruction to be trapped when encountered.

* * * * *